US012542216B2

(12) United States Patent
Arkoff et al.

(10) Patent No.: US 12,542,216 B2
(45) Date of Patent: Feb. 3, 2026

(54) PERSONALIZED AI AGENT AS A CASE MANAGER

(71) Applicant: OneSource Solutions International, Inc., Sudbury, MA (US)

(72) Inventors: Harold Arkoff, Sudbury, MA (US); Vedran Jukic, Trieste (IT)

(73) Assignee: OneSource Solutions International, Inc., Sudbury, MA (US)

( * ) Notice: Subject to any disclaimer, the term of this patent is extended or adjusted under 35 U.S.C. 154(b) by 0 days.

(21) Appl. No.: 19/271,679

(22) Filed: Jul. 16, 2025

(65) Prior Publication Data

US 2026/0024668 A1 Jan. 22, 2026

Related U.S. Application Data

(60) Provisional application No. 63/672,870, filed on Jul. 18, 2024.

(51) Int. Cl.
G16H 50/30 (2018.01)
(52) U.S. Cl.
CPC .................. *G16H 50/30* (2018.01)
(58) Field of Classification Search
CPC ..................................... G16H 50/30
USPC ......................................... 705/2–3
See application file for complete search history.

(56) References Cited

U.S. PATENT DOCUMENTS

| 7,447,643 | B1* | 11/2008 | Olson | G16Z 99/00 |
| | | | | 706/46 |
| 10,446,273 | B1* | 10/2019 | McNair | G16H 50/30 |
| 11,494,669 | B2* | 11/2022 | Hazard | G06N 20/00 |
| 11,868,613 | B1* | 1/2024 | Raffy | G06N 20/10 |
| 11,894,127 | B1* | 2/2024 | McNair | G06Q 10/067 |
| 2003/0110059 | A1* | 6/2003 | Janas, III | G16H 40/20 |
| | | | | 705/2 |
| 2007/0088635 | A1* | 4/2007 | King | G06Q 40/12 |
| | | | | 705/30 |

(Continued)

*Primary Examiner* — Michael Tomaszewski
(74) *Attorney, Agent, or Firm* — IP Consulting Group; Michael Razavi; Alfred F. Hoyte, Jr.

(57) ABSTRACT

A personalised artificial-intelligence (AI) case-manager platform provides real-time, policy-constrained clinical decision support. It ingests heterogeneous data from electronic-health records (EHRs), connected medical devices, and clinician inputs; fuses them with a traceable, multilingual reasoning engine; and screens every candidate action through a multi-tier policy-constraint layer that respects patient-consent artefacts, safety grammars, and jurisdictional rules. Dual-factor credential verification and dynamic, role-based access control secure all protected-health-information (PHI) transactions, while a cryptographically chained audit trail—keyed by a global trace identifier—records inputs, rules, overrides, and triggered workflows. Authorised feedback is adjudicated and fed to adaptive learning modules that tune patient-specific and population-level behaviour. A conflict-detection service flags discordant data streams, and a governance-validated workflow engine can issue proactive alerts, automated record updates, or human-in-the-loop escalations. The platform thus delivers explainable, equitable, and continuously learning automation without compromising privacy or clinical accountability.

20 Claims, 8 Drawing Sheets

(56) References Cited

U.S. PATENT DOCUMENTS

| | | | | |
|---|---|---|---|---|
| 2009/0018864 | A1* | 1/2009 | Gecelter | G16H 40/20 705/2 |
| 2009/0030731 | A1* | 1/2009 | Reiner | G06Q 10/00 434/323 |
| 2011/0112970 | A1* | 5/2011 | Yu | G06Q 40/00 705/2 |
| 2015/0332283 | A1* | 11/2015 | Witchey | G16H 10/60 705/3 |
| 2016/0034642 | A1* | 2/2016 | Ehrhart | G16H 10/60 705/3 |
| 2019/0213333 | A1* | 7/2019 | Williams | G06F 21/6245 |
| 2019/0311220 | A1* | 10/2019 | Hazard | G06F 18/2148 |
| 2019/0333636 | A1* | 10/2019 | Bennett | G16H 50/00 |
| 2023/0104655 | A1* | 4/2023 | Amarasingham | G16H 15/00 705/2 |
| 2023/0153539 | A1* | 5/2023 | Uhl | G06N 3/0895 705/2 |
| 2023/0170092 | A1* | 6/2023 | Moon | G16H 10/60 705/2 |
| 2023/0187069 | A1* | 6/2023 | Choi | G16H 50/20 705/2 |
| 2023/0317261 | A1* | 10/2023 | Vanggaard | G16H 70/20 705/2 |
| 2024/0257928 | A1* | 8/2024 | Harnach | G16H 50/20 |
| 2025/0006376 | A1* | 1/2025 | Soori-Arachi | G16H 50/20 |
| 2025/0087342 | A1* | 3/2025 | Khosla | G16H 40/20 |
| 2025/0259082 | A1* | 8/2025 | Crabtree | G06N 3/042 |
| 2025/0267173 | A1* | 8/2025 | Cline | H04L 63/20 |

* cited by examiner

PERSONALIZED AI AGENT AS A CASE MANAGER

CROSS-REFERENCE TO RELATED APPLICATIONS

This application claims the benefit of priority to U.S. Provisional Application No. 63/672,870, filed on Jul. 18, 2024, the contents of which are incorporated herein by reference in their entirety.

FIELD OF THE INVENTION

The present invention relates to the field of healthcare technology, and more specifically, to systems and methods for automated, policy-constrained, and auditable clinical decision support and case management using a multilingual, credential-verified artificial intelligence (AI) agent.

BACKGROUND OF THE INVENTION

Healthcare organisations increasingly deploy AI tools to assist with triage, monitoring, and documentation; however, conventional systems frequently (i) lack transparency into their reasoning processes, (ii) fail to enforce institution-specific governance policies, (iii) provide limited linguistic inclusivity, and (iv) offer inadequate security for sensitive health data. These deficiencies erode clinical trust, impede regulatory approval, and expose providers to liability. Moreover, existing solutions seldom capture or operationalise clinician feedback in a formal, traceable manner, leading to model drift and uncorrected systemic bias. Consequently, there is a pressing need for a unified architecture that couples explainable AI inference with deterministic policy enforcement, robust multilingual interaction, continuous human-in-the-loop learning, and end-to-end auditability.

SUMMARY OF THE INVENTION

The disclosed platform, referred to herein as the personalised AI case manager, is an integrated, constraint-governed system that delivers real-time clinical decision support and continuous patient case management within a rigorously auditable, privacy-preserving perimeter. At its core, an AI reasoning engine absorbs heterogeneous, multimodal inputs—ranging from electronic-health-record (EHR) data and connected-device telemetry to clinician-authored notes—and synthesises patient-contextualised recommendations through a fusion of symbolic rules, probabilistic inference, and large-language-model techniques. Every provisional output is immediately screened by a policy-constraint engine that enforces a tiered rule hierarchy encompassing patient-safety grammars, jurisdictional mandates, institution-specific protocols, and fine-grained patient-consent artefacts, ensuring that only compliant actions proceed. Secure delivery of those sanctioned outputs is gated by a credential-verification subsystem that requires dual-factor authentication (biometric plus possession factor) and can issue dynamic, time-boxed access scopes tailored to the user's role and situational context.

To guarantee linguistic equity, a multilingual communication module performs speech-to-text conversion, clinical-language normalisation, ontology-aware machine translation, and semantic validation, optionally re-rendering the results via text-to-speech. A feedback-loop engine adjudicates authorised stakeholder input and adaptively refines both patient-specific and population-level model parameters, while a conflict-detection service continuously monitors incoming data streams for inconsistencies and routes disambiguation tasks to credentialled clinicians. All data, rule invocations, user credentials, overrides, and downstream workflow triggers are captured under a globally unique trace identifier within a Merkle-chained audit-trail architecture that spans an input-data registry, rule-application log, override recorder, reasoning-trace generator, and trace-archive store. Finally, a governance-validated workflow trigger module can initiate automated record updates, care-team notifications, or supervisory escalations-thereby enabling proactive, accountable intervention without compromising privacy, safety, or regulatory conformity.

DETAILED DESCRIPTION OF THE INVENTION

Figure 1:
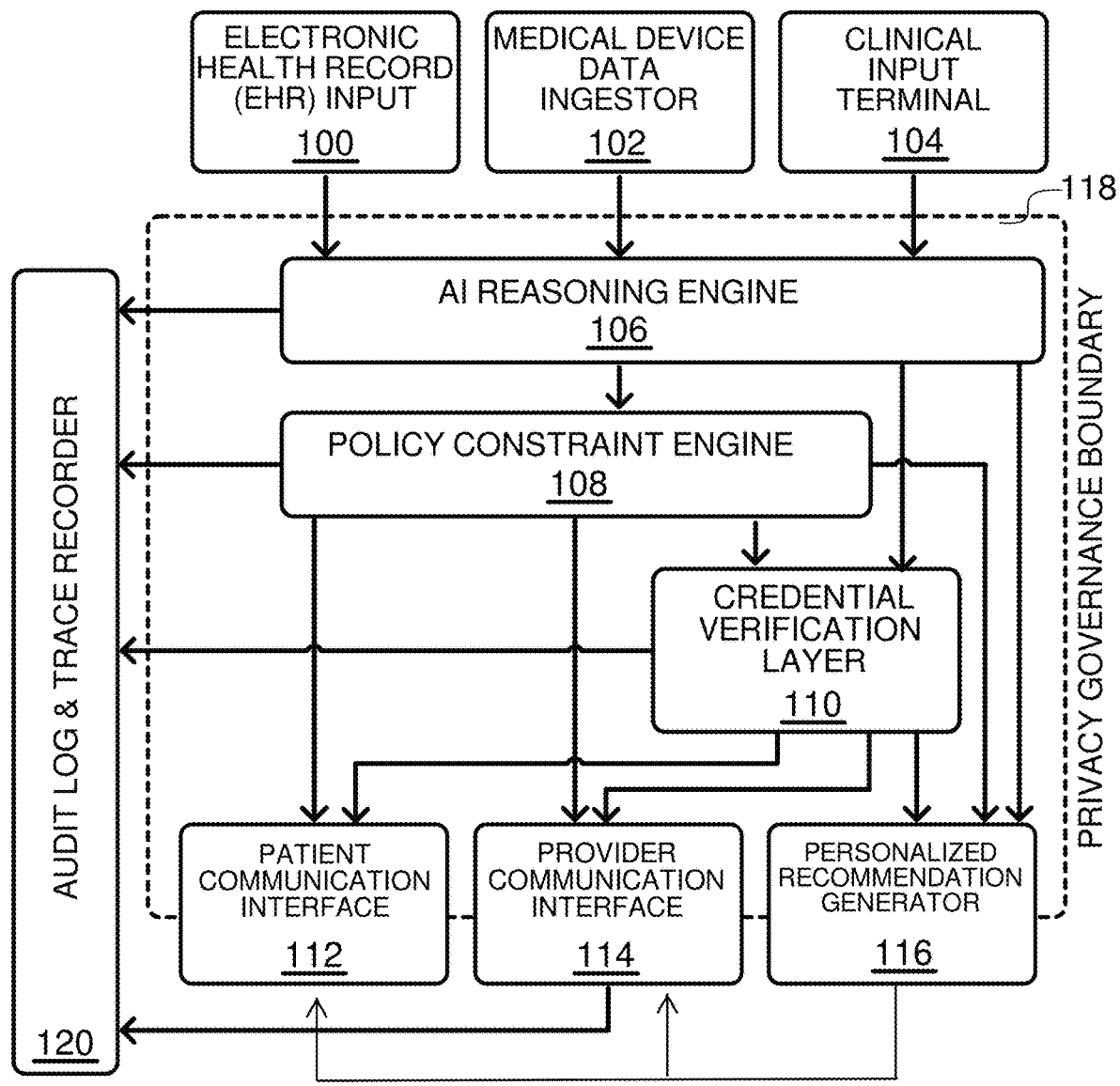
FIG. 1 is an illustrative overview of the overall system architecture.

The personalised AI case-manager platform presented herein unifies real-time clinical data ingestion, policy-constrained inference, multilingual interaction, credential-enforced security, adaptive feedback learning, and cryptographically sealed auditability. FIG. 1 is an illustrative overview of the overall system architecture, including data ingress points (EHR 100, device ingestor 102, clinical terminal 104), the AI reasoning engine 106, policy-constraint engine 108, credential-verification layer 110, patient interface 112, provider interface 114, personalised recommendation generator 116, privacy governance boundary 118, and audit log & trace recorder 120.

Structured information such as laboratory values, diagnoses, and longitudinal vital-sign trends flows from an electronic-health-record interface 100, while continuous telemetry arrives through a medical-device data ingestor 102 that converts waveform feeds into timestamped tuples. Clinician-authored notes and ad-hoc queries are captured at a clinical input terminal 104. Each record—irrespective of source—is time-stamped, source-annotated, and written to an input-data registry for provenance and replayability.

Within the same architectural view of FIG. 1, an AI reasoning engine 106 fuses symbolic triage rules, probabilistic Bayesian networks, and a large-language-model component into a unified intermediate representation (UIR) that carries confidence measures and explanatory text. UIR is a combined internal data structure produced by the AI reasoning engine, which integrates multiple reasoning approaches (symbolic rules, probabilistic Bayesian networks, and large-language-model outputs) into a single, standardized representation. Every UIR object passes immediately to a policy constraint engine 108 that applies a three-tier hierarchy of guardrails: patient-safety exclusions, jurisdiction-specific regulations, and local institutional protocols. Recommendations that violate any tier are modified, blocked, or escalated. A continuously running conflict-detection service reconciles overlapping inputs from multiple sensors and electronic charts. For instance, if two pulse-oximeters diverge by at least five percentage points, a reconciliation task is surfaced through the provider interface 114. The policy-constraint engine also cross-checks each candidate action against patient-specific consent artefacts stored in the electronic record, thereby ensuring that automated recommendations respect granular privacy directives such as data-sharing opt-outs or care-plan limitations.

Within FIG. 1, every outbound message must first pass through the credential-verification layer 110. This layer enforces dual-factor authentication by requiring both a positive biometric match (for example, fingerprint or facial template) and a cryptographically time-bounded token generated on a possession factor, such as a hardware key or mobile authenticator. Only when both factors are satisfied does the system expose protected-health information (PHI) to the requesting user. Once authentication succeeds for a patient, the message is delivered to a mobile-optimised patient interface 112. This interface presents recommendations, alerts, and educational material in plain language, adapting font size, colour contrast, and iconography for small-screen usability. When the authenticated user is a clinician, the same sanctioned output is routed instead to a provider dashboard 114. The dashboard aggregates multiple patients panels, displays higher-granularity data—including vital-sign trends and lab deltas—and offers quick-action buttons for order entry or note-taking. Both the patient interface 112 and the provider dashboard 114 receive content that has been post-processed by a personalised-recommendation generator 116. This generator applies role-based redaction, language preference settings, and context-aware highlighting so that each recipient sees only the information that is clinically relevant and permissioned for their credentials. These components operate inside a privacy governance boundary 118 whose perimeter services apply transport-layer encryption and data-loss-prevention rules. Every transaction is recorded in an audit log and trace recorder 120, which hashes events into a Merkle tree to guarantee tamper-proof evidence over a ten-year retention horizon. The audit log assigns a globally unique trace identifier (GUID) to each clinical episode; this GUID is propagated across four modules—an input-data registry (which records all raw clinical inputs received), a rule-application log (which captures each decision rule applied and its outcome), an override recorder (which documents any manual modifications to system recommendations), and a trace archive (which stores the complete chronological history of the episode)—thereby enabling one-click correlation of all artefacts associated with a single care event.

Figure 2:
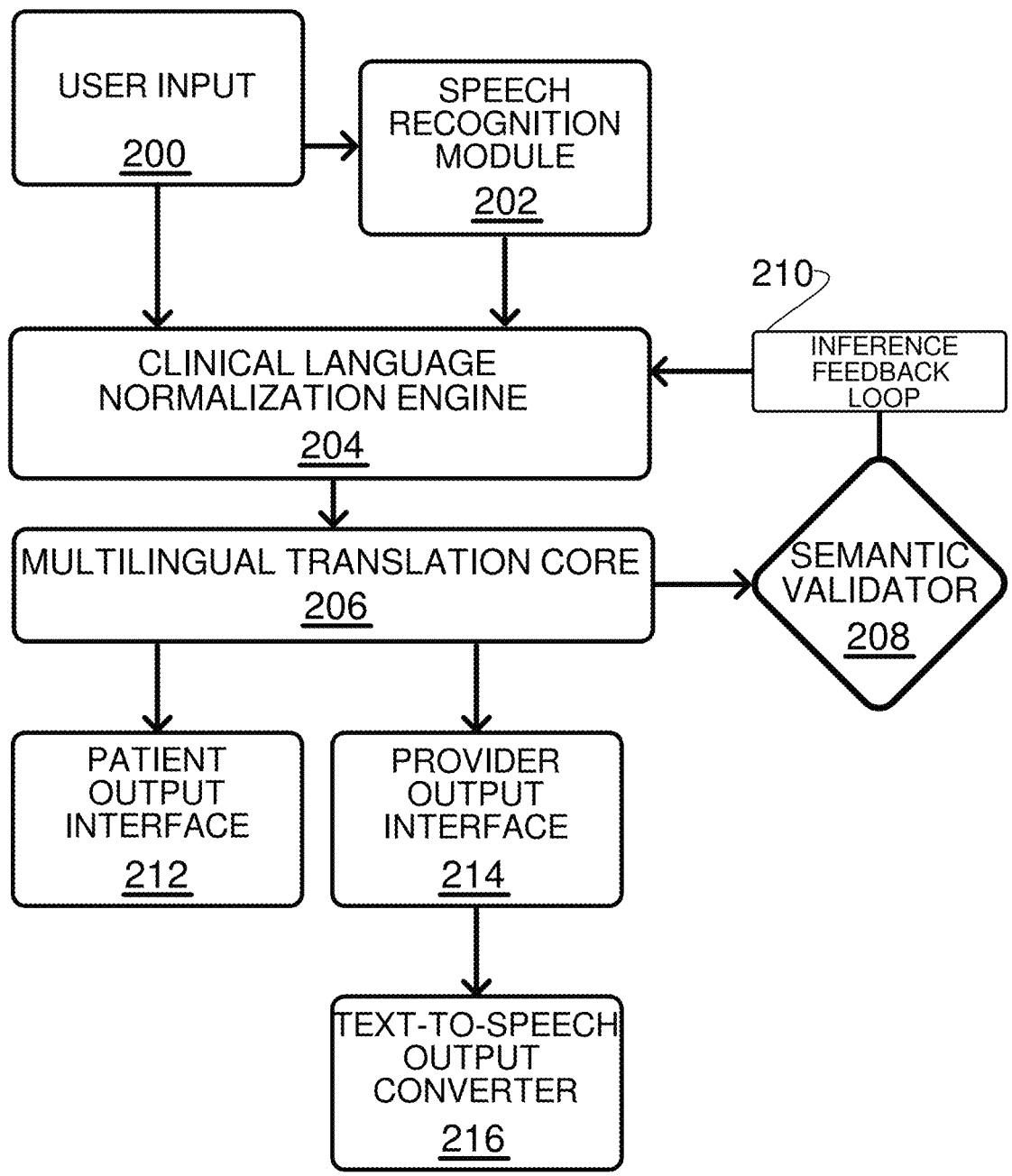
FIG. 2 illustrates the multilingual processing.

FIG. 2 illustrates the multilingual processing pipeline from user input 200 or speech-recognition module 202 through clinical language normalisation 204, multilingual translation core 206, semantic validator 208, inference feedback loop 210, and output interfaces 212/214 with optional text-to-speech converter 216.

A multilingual exchange begins when the platform receives a user utterance. If the utterance arrives as plain text, it is accepted directly at input node 200; if it is spoken, a domain-adapted speech-recognition module 202 converts the audio waveform into text while embedding timing markers that support later audit replay. The raw text then enters a clinical-language-normalisation engine 204. This module applies synonym tables, spell-correction, and phrase-expansion routines, ultimately mapping every clinically significant term to a canonical identifier drawn from controlled vocabularies such as SNOMED CT (Systematised Nomenclature of Medicine—Clinical Terms) and LOINC (Logical Observation Identifiers Names and Codes). During this transformation the normaliser inserts lightweight, inline metadata tags—for example, <med: SNOMED-17363006> for "metformin"—so that downstream components can recognise and preserve critical clinical intents regardless of surface wording. The annotated text proceeds to a multilingual-translation core 206, which is a neural sequence-to-sequence model fine-tuned on parallel corpora of discharge summaries, progress notes, and patient-education leaflets. Because ontology tags were embedded upstream, the translator can lock those spans and translate only the surrounding narrative, ensuring that identifiers like medication codes or procedure names remain unchanged across language boundaries. A semantic validator 208 evaluates the draft translation by computing automatic metrics—BLEU for n-gram overlap and a concept-alignment score that checks whether every ontology tag in the source is mirrored in the target. If either score falls below a configurable threshold, the validator routes the item to a bilingual reviewer and records the round-trip latency for quality metrics. When a human reviewer approves—or when the validator auto-accepts—a translation, the annotated pair is fed into an inference-feedback loop 210. This loop appends the example to an internal training buffer; at scheduled intervals the system performs incremental fine-tuning so that error patterns discovered in production are quickly amortised into model weights. The fully validated, context-preserving message is then delivered to the appropriate front end. A patient sees the content through interface 212, which styles explanations at an accessible reading level, whereas a clinician views it on provider interface 214, where domain-specific jargon is retained. If the patient has enabled audio support—or if the message is an urgency alert for hands-free consumption—a text-to-speech converter 216 renders the translated text into natural-sounding speech, matching the user's preferred voice and prosody settings. Throughout the pipeline, every intermediate artefact—the original text, normalised form, translation draft, validator metrics, reviewer comments, and final output—is timestamped and linked to the decision episode's global trace identifier. This linkage guarantees that auditors can reconstruct the linguistic pathway end-to-end and verify that no semantic drift or privacy breach occurred at any stage.

Figure 3:
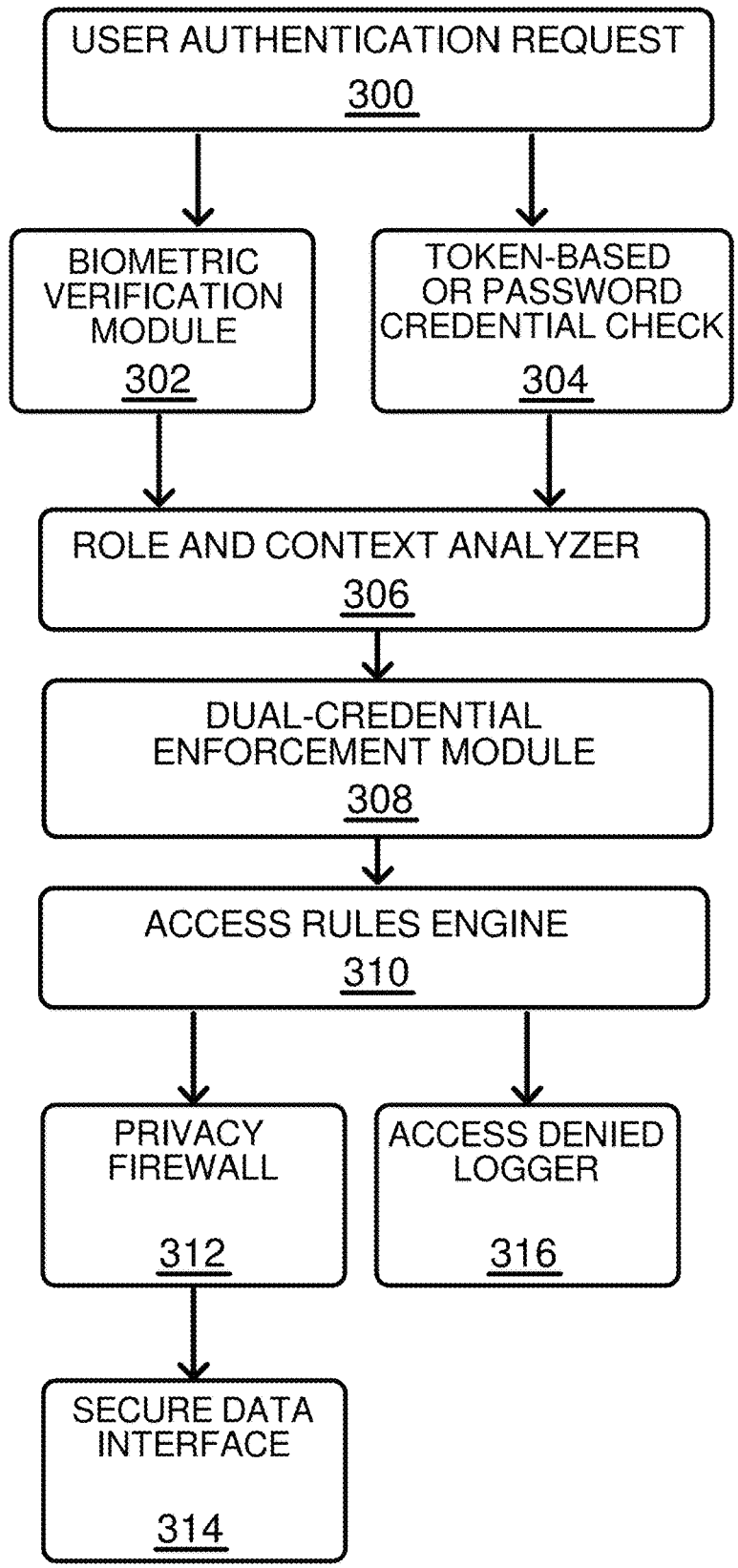
FIG. 3 details the credential-verification and access-control flow.

FIG. 3 details the credential-verification and access-control flow, beginning with an authentication request 300, biometric check 302, token/password check 304, role & context analysis 306, dual-credential enforcement 308, access rules engine 310, privacy firewall 312, secure data interface 314, and access-denied logger 316. Credential verification and contextual access control are detailed in FIG. 3. Every protected interaction with the personalised AI case manager begins at authentication event 300, where the user's client submits a login payload that includes a biometric sample—such as a fingerprint minutiae vector or face-embedding—and a one-time cryptographic token generated by a possession factor (for example, a FIDO2 hardware key or TOTP code). The payload is split in parallel: a biometric-verification module 302 compares the live sample against a template stored in a secure element, requiring a similarity score above a configurable threshold; concurrently, a token/password check 304 validates the transient secret, confirms its time-to-live has not expired, and ensures it has not been replayed. Results from blocks 302 and 304 converge at a role-and-context analyser 306, which performs attribute-based access-control (ABAC) evaluation. The analyser pulls the user's role (e.g., attending physician, ward nurse, or external consultant), physical or network geolocation, current shift schedule, and the specific intended action (read vitals, write orders, export data). It also checks whether the user is already assigned to the patient or has been granted a temporary consult role via a prior escalation pathway. A strict dual-credential enforcement gate 308 permits passage only if both authentication channels succeeded and the role-and-context analyser recorded no policy conflicts. Otherwise, the request is redirected to a read-only, de-identified "visitor" mode that exposes educational content but withholds protected-health information (PHI). Requests that clear gate 308 reach an access-rules engine 310, which executes institution-authored policies expressed in a machine-readable format (e.g., XACML or Rego). These policies incorporate patient-consent artefacts, governing statutes, and departmental standard-operating procedures; they may, for example, deny chart-export operations for psychiatric notes originating from a different jurisdiction. The engine's decision, if positive, routes through a privacy firewall 312. The firewall can perform run-time redaction—masking secondary identifiers such as next-of-kin phone numbers—before forwarding the payload to a secure-data interface 314 that delivers content over mutually authenticated gRPC channels with AES-GCM encryption. Any rejection—whether due to failed biometrics, token mismatch, ABAC conflict, or policy veto—is captured by an access-denied logger 316. The logger writes an immutable record comprising user ID, failure reason, timestamp, and the decision episode's global trace identifier (GUID) to a Merkle-chained audit store, supporting subsequent forensic analysis. Because the role-and-context analyser 306 continuously monitors session attributes, the system can issue dynamic, time-boxed access scopes. A consulting cardiologist, for instance, might receive a two-hour window in which continuous telemetry streams are visible, after which the scope expires automatically without manual intervention—thereby enforcing least-privilege principles while still facilitating timely expert review.

Figure 4:
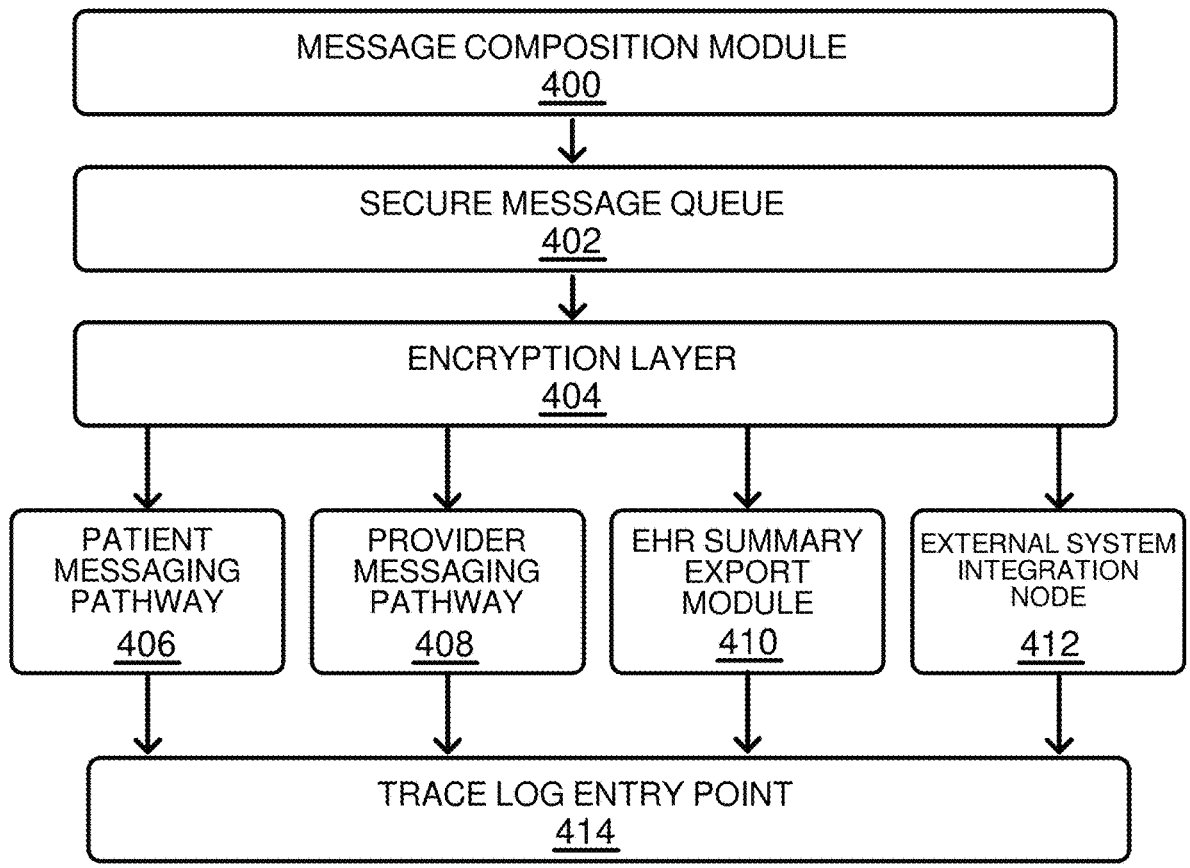
FIG. 4 illustrates the secure communication pathways of the inventive system.

FIG. 4 presents secure communication pathways comprising message composition 400, secure queue 402, encryption layer 404, and delivery spokes to patient 406, provider 408, EHR export 410, and external integration node 412, with trace log entry 414. Message Composition Module 400 receives as input the structured recommendations, explanatory text, and metadata produced by the upstream reasoning and policy-constraint layers. These inputs may include confidence measures, safety-screened directives, and jurisdiction-specific adjustments. The module then packages this information into an outbound communication payload that conforms to the required delivery format—such as HL7 observations, mobile push payloads, or SMART-on-FHIR launch tokens. As shown in FIG. 4, the packaged outbound content is placed into a secure queue 402 that enforces exactly-once delivery semantics, ensuring that each message is transmitted reliably and without duplication. In this way, Message Composition Module 400 outputs a fully assembled, standards-compliant message, ready for secure transmission to downstream systems such as clinician dashboards, patient-facing portals, or hospital messaging buses. An encryption layer 404 conducts X25519 key exchange followed by AES-GCM payload sealing, after which messages route toward patient devices 406, provider dashboards 408, EHR export mechanisms 410, or an external integration node 412. Each hop is mirrored into a trace log entry point 414 so that the audit store always preserves a hash-linked lineage. Inter-module communication is achieved through gRPC (remote-procedure-call) channels that carry Protocol-Buffers messages; composition 400 embeds the originating GUID so downstream consumers can merge their local logs with the master audit chain.

Figure 5:
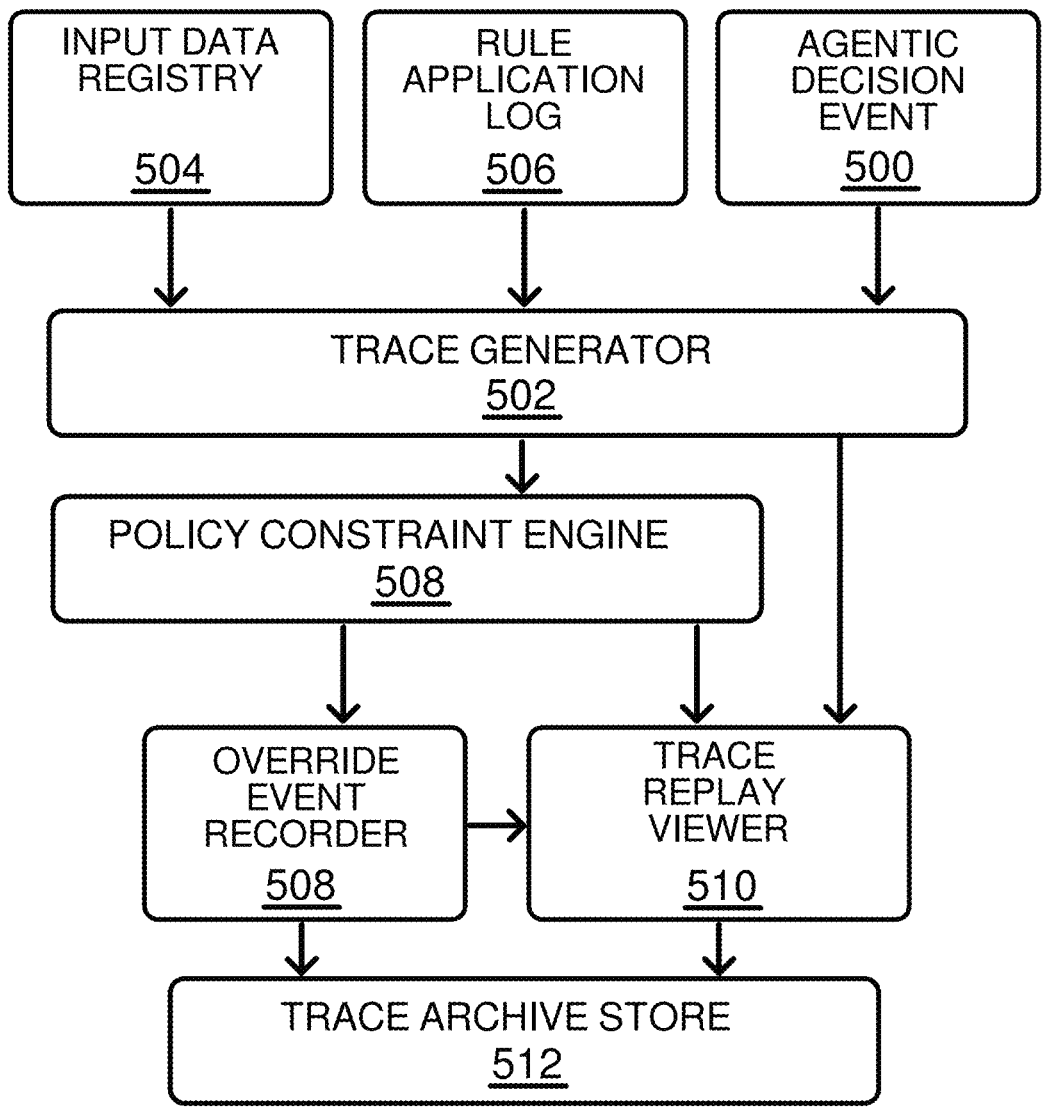
FIG. 5 shows the reasoning-trace and override-logging architecture.

FIG. 5 shows the reasoning-trace and override-logging architecture, beginning with agentic decision event 500, trace generator 502, input-data registry 504, rule-application log 506, override recorder 508, trace-replay viewer 510, and trace archive 512. When the AI engine issues a decision event 500, a trace generator 502 serialises the entire inference path into JSON-LD, referencing raw inputs parked in an input-data registry 504 and the governing rule sets captured in a rule-application log 506. If a user overrides a recommendation, an override recorder 508 stores both original and modified payloads, signed with the user's credential digest. Investigators can replay every edge of the decision (means that investigators can step through each causal transition in a sequence) through a trace-replay viewer 510, and the complete history is written once to a trace archive 512 for long-term compliance. Override events propagate a compensating-action message to the audit chain, ensuring that any downstream workflow initiated by the original recommendation is either amended or rolled back under governance control.

Figure 6:
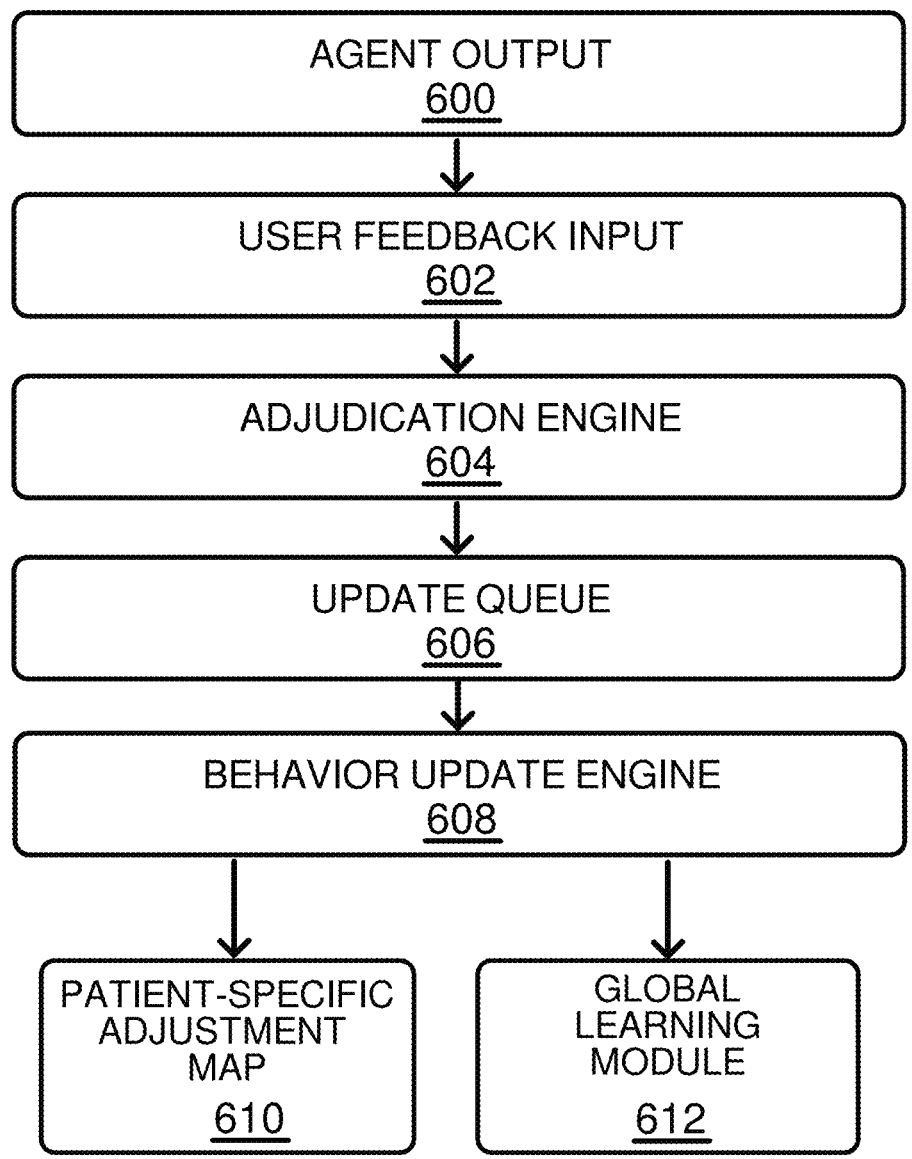
FIG. 6 diagrammatically illustrates the feedback-loop engine from agent output 600.

FIG. 6 depicts the feedback-loop engine from agent output 600, user feedback 602, adjudication engine 604, update queue 606, behaviour-update engine 608, patient-specific adjustment map 610, and global learning module 612. An adaptive-learning cycle begins once the platform has delivered a sanctioned recommendation or alert, represented in the diagram as agent output 600. The output carries a global trace identifier (GUID) that links it to all upstream inputs and policy decisions, thereby giving downstream processes—including learning loops—a verifiable audit anchor. End users—patients or clinicians—may respond by submitting structured or free-text corrective feedback 602. Each submission is cryptographically signed by the user's session key and routed over mutually authenticated gRPC, preventing spoofing or tampering in transit. Arriving feedback is passed to an adjudication engine 604, which performs two gating checks. First, it confirms the user's credential validity by querying the same dual-factor records recorded in the FIG. 3 access logs. Second, it evaluates the proposed change against policy objects to ensure no modification would conflict with patient-safety constraints, regulatory mandates, or institution-specific rules. Rejected feedback is archived for transparency but never influences system behaviour. Feedback that clears adjudication is appended to an update queue 606. The queue supports priority weighting—for example, critical drug-interaction corrections outrank cosmetic text edits—and assigns each item a semantic label (diagnostic, therapeutic, linguistic, or user-experience) so that downstream components can apply domain-specific update logic. A behaviour-update engine 608 consumes queued items under strict version control. If the associated artefact is a differentiable neural model (e.g., the multilingual translation core), the engine performs gradient-based fine-tuning using a copy-on-write strategy, followed by offline validation on a hold-out set. Symbolic knowledge graphs or rule tables instead receive deterministic re-ranking or weight adjustments. Canary deployment flags allow new parameters to activate for a small traffic slice, with automatic rollback if predefined performance or safety metrics degrade. Two persistence layers receive the updated knowledge. In patient-specific adjustment map 610, the change is scoped to the individual's record—for instance, downgrading alert sensitivity for a known benign arrhythmia pattern. In global learning module 612, the same correction may—or may not—be generalised after population-level safety checks, thereby protecting individual safety while progressively enhancing institutional performance. Concurrently, every accepted feedback item is stored in a population-level analytics store that aggregates longitudinal learning events across the entire deployment. Quality-of-care committees can mine this store for drift detection, bias audits, or model-refresh scheduling. All write operations—from adjudication outcome to model-parameter hash—are timestamped and linked back to the decision episode's GUID, ensuring end-to-end traceability within the audit framework described for FIG. 5.

Figure 7:
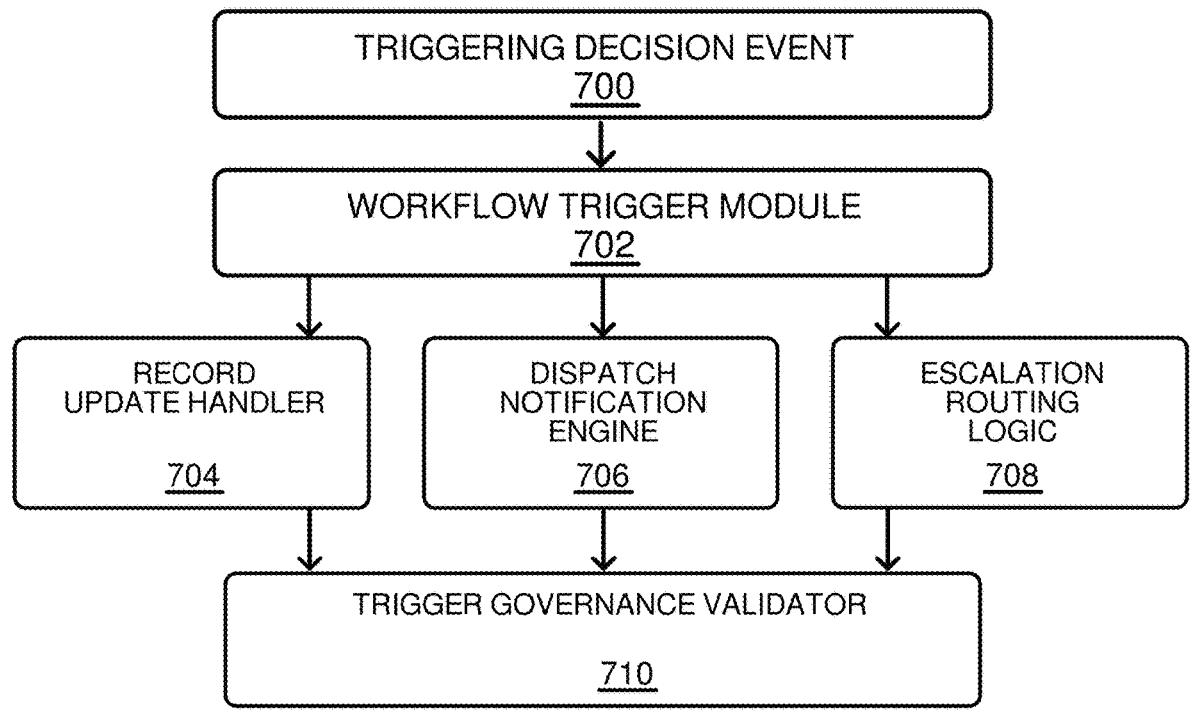
FIG. 7 outlines external workflow triggering.

FIG. 7 outlines external workflow triggering, featuring decision event 700, workflow trigger module 702, record update handler 704, dispatch notification engine 706, escalation routing logic 708, and trigger-governance validator 710. In the context of FIG. 7, external workflow orchestration refers to the platform's ability to reach beyond its own decision-making boundary and programmatically trigger downstream actions—such as updating an electronic-health-record (EHR) system or paging an on-call clinician—through secure, policy-validated interfaces. These outward-facing tasks occur after the core inference and policy-screening stages are complete, allowing the AI agent to translate its sanctioned recommendations into concrete operational steps across disparate hospital systems and human workstreams. A decision event 700 is a sanctioned AI output that meets a predefined triggering condition (for example, sepsis-risk≥0.9 or medication-interaction severity="critical"). When such a condition is satisfied, the system attaches a trigger flag to the decision artefact and hands it to the workflow-trigger module for further action. Workflow-trigger module 702 receives the flagged decision, consults a configuration table that maps trigger types to allowable actions, and then packages the requisite payloads while ensuring each candidate action is first cleared by the trigger-governance validator 710. Record-update handler 704 commits structured information—such as new problem lists, allergy flags, or order sets—directly into the patient's EHR, performing any necessary schema translation and writing an audit reference back to the trace log. Dispatch-notification engine 706 formats time-critical alerts (e.g., secure push messages, SMS, or pager texts) and sends them to the designated care-team roster, embedding the decision's global trace identifier so that recipients can drill down into the underlying rationale. Escalation-routing logic 708 evaluates service-line policies and, when escalation criteria are met (for instance, an unacknowledged critical alert after five minutes), forwards the case—with full context—to a supervisory clinician or rapid-response team, tracking acknowledgement receipts to close the loop. Prior to execution, a trigger-governance validator 710 applies formal verification against finite-state representations of institutional policy, ensuring the proposed action lies within the practitioner's license and the patient's consent. Should governance reject an automated action, a human-in-the-loop task is generated and surfaced on the provider dashboard 114, preserving workflow continuity without violating policy.

Figure 8:
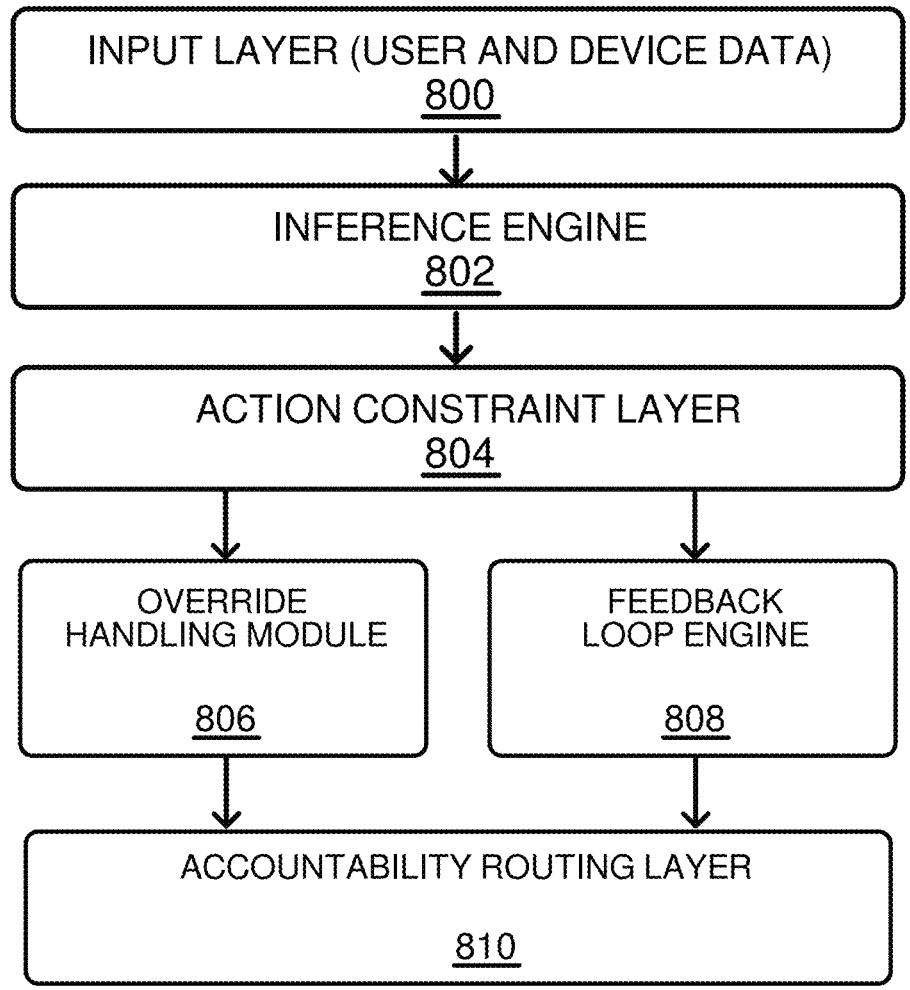
FIG. 8 portrays the layered agentic AI stack.

Finally, FIG. 8 portrays the internal agentic-AI stack, including input layer 800, inference engine 802, action-constraint layer 804, override handling module 806, feedback-loop engine 808, and accountability routing layer 810. The vertical stack in FIG. 8 represents the end-to-end execution path of a single decision episode, with each horizontal layer exposing well-defined interfaces that are connected by an event bus and tracked by a cryptographic audit spine. Input layer 800 forms the ingestion boundary. It hosts stream adapters for HL7-FHIR messages, MQTT medical-device telemetry, and REST endpoints from third-party apps. Upon arrival, each payload is normalised to a canonical schema, tagged with a global trace identifier (GUID), and validated for basic data integrity before being forwarded downstream via a publish/subscribe message bus powered by NATS JetStream. The bus guarantees at-least-once delivery and lets diagnostic tools subscribe passively—without ever blocking real-time clinical traffic. The normalised events next reach the inference engine 802, a micro-service cluster that blends three reasoning paradigms: (i) deterministic rule evaluation for hard patient-safety checks, (ii) probabilistic Bayesian networks for risk stratification, and (iii) transformer-based large-language-model (LLM) services for narrative synthesis. Each micro-model runs inside a container pinned to an explicit version tag; the ensemble manager records model hashes and configuration digests so that any future audit can recreate the exact inference environment. Immediately after inference, outputs are funnelled into an action-constraint layer 804. This layer enforces a three-tier guardrail hierarchy—patient-safety grammars, jurisdictional mandates, and site-specific policies—plus an additional filter for patient-consent artefacts retrieved from the electronic record. The constraint engine is implemented in Rego (Open Policy Agent) and subjected to nightly formal-verification sweeps that prove key safety invariants. When users disagree with a sanctioned output, their changes enter the override-handling module 806. Here, each override is checked for credential legitimacy and policy compatibility; if accepted, the module emits a compensating-action event that updates or rolls back any downstream workflow already triggered by the superseded recommendation. Both the original and the amended payloads are immutably hashed and linked to the GUID. The feedback-loop engine 808 consumes adjudicated overrides as well as non-override feedback (e.g., translation corrections). It determines whether the change should modify patient-specific parameters, propagate to the global model, or be quarantined for manual review. All parameter deltas are versioned, canaried, and rolled back automatically if safety metrics deteriorate. Every state transition—from initial ingestion through inference, constraint, override, and learning—passes through the accountability routing layer 810. This layer appends a cryptographic hash of the current artefact to a Merkle tree stored in the audit log, stamps an RFC 3161 time-token, and propagates the GUID to the next hop. As a result, regulators or investigators can deterministically replay the complete life-cycle of any decision by traversing hash-chained checkpoints. To support federated analytics across multiple institutions, the stack can optionally route batched gradient updates through a homomorphic-encryption pipeline or a secure-multiparty-computation (SMPC) protocol. In this mode, model parameters are aggregated without ever exposing raw protected-health information, thereby complying with cross-border privacy statutes while still improving global model performance. The publish/subscribe bus that interconnects all layers also feeds a live governance dashboard. Administrators can view per-layer latencies, policy-violation counts, and model-version drift in real time, enabling rapid remediation without inserting blocking calls into the clinical pathway.

The personalised AI case-manager platform is infrastructure-agnostic and can be deployed (i) on-premises inside a hospital's secure network, (ii) in a private or public cloud, or (iii) in a hybrid topology that splits sensitive components from elastic compute services. In a typical hybrid implementation, the credential-verification layer 110, policy-constraint engine 108, and audit-trail subsystems (GUID registry, Merkle store, and secure element for biometrics) reside within the hospital's demilitarised zone (DMZ) to satisfy data-sovereignty and latency requirements, while burstable workloads—such as large-language-model inference, multilingual translation core 206, and federated-analytics pipelines—run in an isolated virtual private cloud (VPC) connected over mutually authenticated TLS 1.3 tunnels. Edge gateways at the hospital boundary perform hardware-rooted attestation before permitting traffic to enter the cloud segment, and all inter-segment messages retain their global trace identifier so that end-to-end replay remains intact. For institutions preferring a fully on-prem deployment, the entire FIG. 8 stack can be containerised and orchestrated on a hardened Kubernetes cluster housed in the hospital data centre, with air-gapped update mechanisms for model refreshes. Conversely, cloud-native health-tech providers may elect to host every component in a HIPAA-compliant cloud region, leveraging managed key-management services for cryptographic operations and auto-scaled serverless functions for workflow triggers. In every scenario, identical policy bundles and accountability hashes propagate across boundaries, ensuring that the platform's safety guarantees, privacy controls, and auditability remain uniform regardless of physical location.

Technical Advantages

By integrating conflict-detection, multi-tier policy enforcement, multilingual equity, dual-factor security, cryptographic auditability, human-directed override, and continuous learning, the invention establishes a robust, future-proof standard for digital case management. In contrast to legacy point solutions, every recommendation issued by the platform can be traced in seconds to its originating data, applied policies, subsequent overrides, and any downstream workflow it initiated, providing an unprecedented level of transparency and institutional control.

The personalised AI case manager furnishes a technologically advanced yet legally robust foundation for safe, multilingual, and traceable clinical automation.

What is claimed is:

1. A computer-implemented system for cryptographically governed clinical decision support, comprising:
   (a) an AI reasoning engine coupled to a data-ingestion module configured to receive heterogeneous patient information including electronic-health-record data, medical-device telemetry, and clinician-authored inputs, the data-ingestion module transforming said information into a unified intermediate representation (UIR) that embeds ontology-linked clinical identifiers, explanatory metadata, and probabilistic confidence values; the AI reasoning engine comprising a hybrid inference pipeline that executes symbolic triage rules, probabilistic Bayesian models, and transformer-based natural-language models over the UIR to generate provisional clinical outputs with associated reasoning metadata;
   (b) a policy-constraint engine configured to evaluate each provisional clinical output against at least one of: patient-safety rules, regulatory mandates, institution-specific policies, and stored patient-consent artefacts, using machine-verifiable constraints and a formal-verification routine that verifies compliance with predefined patient-safety invariants to produce a sanctioned output;
   (c) a credential-verification subsystem configured to:
      (i) accept an institution-issued identity assertion indicating the clinician's identity, role, and session attributes and evaluate said assertion within a role- and context-based access-control framework; and
      (ii) verify a possession factor using a clinician-associated mobile device designated as an authorized authenticator, the mobile device performing biometric confirmation or a cryptographic challenge-response;
   wherein the credential-verification subsystem issues a dynamic, time-boxed, least-privilege access scope tied to a clinical episode only when both the identity-assertion evaluation and the possession-factor verification succeed, and automatically revokes the access scope upon expiration of the time window, unavailability or lock of the authenticated mobile device, or a change in the session attributes invalidating the identity assertion;
   (d) a multilingual communication module translating the sanctioned output into a target language while preserving clinical intents identified by ontology-aware metadata tags, performing neural-machine translation, computing a semantic-alignment score between source and translated representations, and rejecting translations falling below a predefined clinical-concept fidelity threshold;
   (e) an override-handling module configured to authenticate an authorized user submitting a modification, validate the modification against institutional policy, identify machine-controlled clinical workflows already initiated based on the sanctioned output, and generate compensating-action events that update or roll back those workflows;
   (f) a feedback-loop engine configured to receive structured clinician or patient feedback, validate the feedback against patient-safety constraints, cryptographically anchor validated feedback to a provenance record, and apply patient-specific or population-level parameter updates to at least one of the AI reasoning engine or the policy-constraint engine using a governed copy-on-write model-update pipeline with safety-verification checkpoints;
   (g) an audit-trail subsystem configured to immutably record, under a globally unique trace identifier (GUID), the UIR, provisional outputs, sanctioned outputs, applied policies, authentication events, overrides, feedback items, and compensating-action events, the audit-trail subsystem
      (i) storing each artefact as a node in a hash-chained Merkle sequence;
      (ii) applying a trusted timestamp to each node; and
      (iii) preventing advancement of any policy-constraint or workflow-execution state for the corresponding clinical episode unless appending a new audit node to the Merkle sequence successfully completes.

2. The system of claim 1, wherein the audit-trail subsystem further stores a hash-chained chronology keyed to a globally unique trace identifier (GUID) for each decision episode, the GUID being propagated across all audit artefacts, enabling cryptographic verification of decision integrity.

3. The system of claim 1, wherein the multilingual communication module comprises:

(i) a speech-to-text component;
(ii) a clinical language normaliser interfacing with standard ontologies;
(iii) a neural machine-translation component; and
(iv) a semantic-validation component that rejects translations deviating from predefined clinical-concept alignment thresholds.

4. The system of claim 1, further comprising a conflict-detection service that monitors data received from a plurality of heterogeneous input sources, detects inconsistencies and generates a report indicative of the detected inconsistencies.

5. The system of claim 1, wherein the feedback-loop engine applies patient-specific model updates prior to population-level updates when feedback pertains to an identified individual.

6. The system of claim 1, wherein the credential-verification subsystem includes
(i) a biometric-verification module that compares a live sample against a template stored in a tamper-resistant hardware element using a configurable similarity threshold and
(ii) a possession-factor module implemented on a clinician-associated mobile device designated as an authorized authenticator and executing biometric confirmation or a cryptographic challenge-response.

7. The system of claim 1, wherein the policy-constraint engine further comprises a formal-verification routine that, before release of any sanctioned output, verifies compliance with a predefined set of patient-safety invariants.

8. The system of claim 4, wherein upon detecting a data inconsistency that exceeds an adjustable threshold, the conflict-detection service automatically generates a reconciliation task, routes that task to a designated clinician through the provider interface, and records the event in the audit-trail subsystem under the corresponding globally unique trace identifier.

9. The system of claim 1, wherein the audit-trail subsystem stores each recorded artefact as a node in a Merkle tree and applies an RFC 3161 time-stamp token to every node, thereby providing immutable, cryptographically verifiable sequencing of events.

10. The system of claim 1, wherein the feedback-loop engine assigns each validated feedback item a semantic label selected from the group consisting of: diagnostic, therapeutic, linguistic, and user-experience.

11. A computer-implemented method for constraint-governed clinical decision support, the method comprising:
(a) receiving multimodal patient data;
(b) generating, by an AI reasoning engine executing symbolic rules, probabilistic Bayesian models, and transformer-based natural-language models, a provisional clinical output from a unified intermediate representation (UIR) comprising ontology-linked identifiers and explanatory metadata;
(c) evaluating the provisional clinical output, by a policy-constraint engine, against at least one of patient-safety rules, regulatory mandates, institution-specific policies, and stored patient-consent artefacts using machine-verifiable constraints and a formal-verification routine to yield a sanctioned output;
(d) authenticating a requesting clinician by:
(i) receiving an identity assertion issued by an institutional authentication service, the assertion indicating the clinician's identity, role, and session attributes; and
(ii) verifying a possession factor using a clinician-associated mobile device designated as an authorized authenticator, the mobile device performing biometric confirmation or a cryptographic challenge-response;
and issuing, upon successful completion of both authentication steps, a dynamic, time-boxed, least-privilege access scope tied to a clinical episode;
and
automatically revoking the access scope upon expiration of the time window, lock or unavailability of the authenticated mobile device, or a change in the underlying session attributes that invalidates the identity assertion;
(e) translating the sanctioned output into a target language, by a multilingual communication module, while preserving clinical intents identified by ontology-aware metadata tags and computing a semantic-alignment score and rejecting translations falling below a predefined clinical-concept fidelity threshold;
(f) capturing any authorised manual modification to the sanctioned output, validating the modification against institutional policy and, when validated, generating a compensating-action event that updates or rolls back machine-controlled clinical workflows already in progress;
(g) receiving additional stakeholder feedback, validating the feedback against patient-safety constraints, and cryptographically anchoring validated feedback and updating at least one parameter of the AI reasoning engine or the policy-constraint engine using a governed model-update pipeline with safety-verification checkpoints; and
(h) recording, under a globally unique trace identifier, the patient data, provisional output, sanctioned output, applied policies, authentication events, and any validated override or feedback in an immutable audit trail by storing each artefact as a node in a hash-chained Merkle sequence, applying a trusted timestamp to each node, and preventing advancement of policy or workflow state unless appending a new audit node successfully completes.

12. The method of claim 11, further comprising storing a hash-chained chronology keyed to the globally unique trace identifier such that the identifier is propagated across all audit artefacts, thereby enabling cryptographic verification of decision integrity.

13. The method of claim 11, wherein translating the sanctioned output further comprises:
(a) converting speech to text;
(b) normalising clinical language by interfacing with standard ontologies;
(c) performing neural-machine translation; and
(d) rejecting, via semantic validation, any translation whose clinical-concept alignment score falls below a predefined threshold.

14. The method of claim 11, further comprising monitoring data from a plurality of heterogeneous input sources, detecting inconsistencies that exceed a configurable threshold, and generating a report indicative of the detected inconsistencies.

15. The method of claim 11, wherein validated feedback pertaining to an identified individual is applied as a patient-specific model update before any population-level model update is executed.

16. The method of claim 11, wherein authenticating the requesting user further comprises:

(a) comparing a live biometric sample against a template stored in a tamper-resistant hardware element using a configurable similarity threshold; and (b) verifying a possession factor using a clinician-associated mobile device designated as an authorized authenticator and executing biometric confirmation or a cryptographic challenge-response.

17. The method of claim 11, further comprising formally verifying, prior to releasing the sanctioned output, that the output complies with a predefined set of patient-safety invariants.

18. The method of claim 14, further comprising automatically generating, upon detecting the inconsistency, a reconciliation task, routing the task to a designated clinician through a provider interface, and recording the event in the audit trail under the corresponding globally unique trace identifier.

19. The method of claim 11, further comprising storing each audit-trail artefact as a node in a Merkle tree and applying an RFC 3161 time-stamp token to every node to provide immutable, cryptographically verifiable sequencing of events.

20. The method of claim 11, wherein validating stakeholder feedback further comprises assigning to each feedback item a semantic label selected from the group consisting of diagnostic, therapeutic, linguistic, and user-experience.

\* \* \* \* \*